(12) United States Patent
Azuma et al.

(10) Patent No.: US 10,479,313 B2
(45) Date of Patent: Nov. 19, 2019

(54) CURTAIN AIRBAG DEVICE

(71) Applicant: ASHIMORI INDUSTRY CO., LTD., Osaka-shi, Osaka (JP)

(72) Inventors: Hidetaka Azuma, Osaka (JP); Kou Sasaki, Osaka (JP); Shuhei Konishi, Osaka (JP); Masanori Kato, Osaka (JP)

(73) Assignee: Ashimori Industry Co., Ltd., Osaka (JP)

( * ) Notice: Subject to any disclaimer, the term of this patent is extended or adjusted under 35 U.S.C. 154(b) by 131 days.

(21) Appl. No.: 15/876,802

(22) Filed: Jan. 22, 2018

(65) Prior Publication Data

US 2018/0208146 A1    Jul. 26, 2018

(30) Foreign Application Priority Data

Jan. 25, 2017 (JP) .................................. 2017-011532

(51) Int. Cl.
*B60R 21/232* (2011.01)
*B60R 21/231* (2011.01)
*B60R 21/26* (2011.01)
*B60R 21/237* (2006.01)
*B60R 21/213* (2011.01)

(52) U.S. Cl.
CPC .......... *B60R 21/232* (2013.01); *B60R 21/213* (2013.01); *B60R 21/237* (2013.01); *B60R 21/23138* (2013.01); *B60R 21/26* (2013.01)

(58) Field of Classification Search
CPC ................ B60R 21/232; B60R 21/213; B60R 21/23138; B60R 21/237; B60R 21/26
See application file for complete search history.

(56) References Cited

U.S. PATENT DOCUMENTS

| | | | |
|---|---|---|---|
| 2014/0110923 A1* | 4/2014 | Maita | B60R 21/213 |
| | | | 280/730.2 |
| 2014/0265268 A1* | 9/2014 | Wang | B60R 21/232 |
| | | | 280/729 |
| 2017/0282839 A1* | 10/2017 | Nonoyama | B60R 21/232 |
| 2017/0282842 A1* | 10/2017 | Okuhara | B60R 21/237 |
| 2017/0327073 A1* | 11/2017 | Arima | B60R 21/213 |
| 2018/0290617 A1* | 10/2018 | Iwata | B60R 21/232 |
| 2019/0001912 A1* | 1/2019 | Sato | B60R 21/213 |
| 2019/0001913 A1* | 1/2019 | Okuhara | B60R 21/213 |
| 2019/0061672 A1* | 2/2019 | Okuhara | B60R 21/237 |

FOREIGN PATENT DOCUMENTS

JP    2008-030738    2/2008

* cited by examiner

*Primary Examiner* — Drew J Brown
(74) *Attorney, Agent, or Firm* — Hamre, Schumann, Mueller & Larson, P.C.

(57) ABSTRACT

The curtain airbag device includes: an inflator; an airbag; and a restricting member. The airbag includes an outer circumferential joining portion forming a bag body, a gas inlet portion, and a joining portion which is arranged in a region surrounded by the outer circumferential joining portion. The airbag, while being stored in a folded state, includes a roll folding portion formed by folding the bag body into a roll shape with a vehicle interior side base fabric facing outside, and a flip folding portion formed by folding back the bag body with the vehicle interior side base fabric facing inside. The restricting member includes a tip portion fixed to a lower side of a sidewall of a vehicle, and a base end portion joined to a vehicle exterior side base fabric located at the flip folding portion or an upper end portion of the roll folding portion.

8 Claims, 9 Drawing Sheets

Exterior side of vehicle (CAR OUTSIDE) | Interior side of vehicle (CAR INSIDE)

CURTAIN AIRBAG DEVICE

CROSS-REFERENCE TO RELATED APPLICATIONS

The present application claims priority under 35 U.S.C. § 119 to Japanese Patent Application No. 2017-011532 filed on Jan. 25, 2017, the contents of which are incorporated herein by reference in their entirety.

BACKGROUND OF THE INVENTION

Field of the Invention

The present invention relates to curtain airbag devices. The present invention more specifically relates to a curtain airbag device configured to be inflated and deployed downward from the upper side of a sidewall of a vehicle such as an automobile in an emergency of the vehicle so as to protect occupants.

Discussion of the Background

A curtain airbag device is stored in a space between a roof side rail and a ceiling member, for example, and is configured to protect occupants by introducing a gas into an airbag to inflate the airbag and deploy the inflated airbag in the interior space of the vehicle in an emergency such as a side collision of the vehicle. Various studies have been made on mechanisms to deploy the airbag in the interior space of a vehicle without fail. For example, JP 2008-030738 A discloses a head-protecting airbag apparatus in which the inflatable main body in the lower part of the airbag is roll-folded toward the exterior side of the vehicle while the upper edge side inflatable portion is accordion-folded in the direction opposite to the folding direction of the inflatable main body and disposed at the exterior side of the vehicle relative to the roll folding portion. In the airbag apparatus, the gas feed passage and the upper edge side inflatable portion that are inflated rapidly are arranged in the front-rear direction of the vehicle. With this configuration, the roll folding portion is pushed toward the interior side of the vehicle by the inflated gas feed passage and upper edge side inflatable portion, so that the airbag is deployed from the space between the ceiling member and the roof side rail to the interior side of the vehicle.

SUMMARY OF THE INVENTION

The head-protecting airbag apparatus disclosed in JP 2008-030738 A requires the upper edge side inflatable portion that is inflatable rapidly in the front-rear direction of the vehicle. Here, the length of the upper edge side inflatable portion may be shortened to allow the airbag to be inflated to a sufficient thickness as in the case of a front-seat inflatable portion or, conversely, a non-inflatable portion (partitioning portion) may be formed in the upper edge portion of the airbag to reduce the thickness of the upper edge portion of the airbag. In these cases, the main inflatable portion is inflated before the upper edge side inflatable portion is inflated. Such a main inflatable portion may be inflated in the space between the ceiling member and the roof side rail, and may unfortunately be stuck in the space when it needs to be deployed into the interior space of the vehicle. Hence, curtain airbag devices have been demanded which, even in the case of having an air chamber causing the main inflatable portion to be first inflated, can deploy the airbag into the interior space of the vehicle and thereby protect the heads of occupants without fail.

The present invention has been made in view of the above current state of the art, and aims to provide a curtain airbag device that can cause an airbag, having begun to be inflated, to come down from a storage portion on a sidewall of a vehicle without fail to inflate and deploy the airbag in the interior space of the vehicle.

One aspect of the present invention, solving the above problem and achieving the aim, is a curtain airbag device stored in an interior member on an upper side of a sidewall of a vehicle, including: an inflator configured to generate a gas; an airbag that is a bag body stored in a folded state and is configured to be inflated and deployed downward from the upper side of the sidewall of the vehicle by the gas; and a restricting member connecting the airbag and the sidewall of the vehicle. The airbag includes an outer circumferential joining portion joining a vehicle exterior side base fabric and a vehicle interior side base fabric, thereby forming the bag body, a gas inlet portion which is arranged at an upper edge of the airbag and into which the gas is to be introduced, and a joining portion which is arranged in a region surrounded by the outer circumferential joining portion between the gas inlet portion and an end portion of the bag body in a longitudinal direction of the vehicle and joins the vehicle exterior side base fabric and the vehicle interior side base fabric. The airbag, while being stored in the folded state, includes a roll folding portion formed by folding the bag body into a roll shape in a direction from a lower edge of the bag body to an upper edge thereof with the vehicle interior side base fabric facing outside, and a flip folding portion formed by folding back the bag body with the vehicle interior side base fabric facing inside between the roll folding portion and the upper edge of the bag body. The restricting member includes a tip portion fixed to a lower side of the sidewall of the vehicle, and a base end portion joined to the vehicle exterior side base fabric located at the flip folding portion or an upper end portion of the roll folding portion.

The curtain airbag device of the present invention can cause an airbag, having begun to be inflated, to come down from a storage portion on a sidewall of a vehicle without fail to inflate and deploy the airbag in the interior space of the vehicle.

BRIEF DESCRIPTION OF THE DRAWINGS

FIGS. 7A, 7B, 7C and 7D show inflation and deployment of the airbag in time series.

FIGS. 8A, 8B, 8C and 8D show inflation and deployment of the airbag in time series.

DESCRIPTION OF EMBODIMENTS

Hereinafter, one embodiment of the curtain airbag device of the present invention is described with reference to the drawings.

Figure 1:
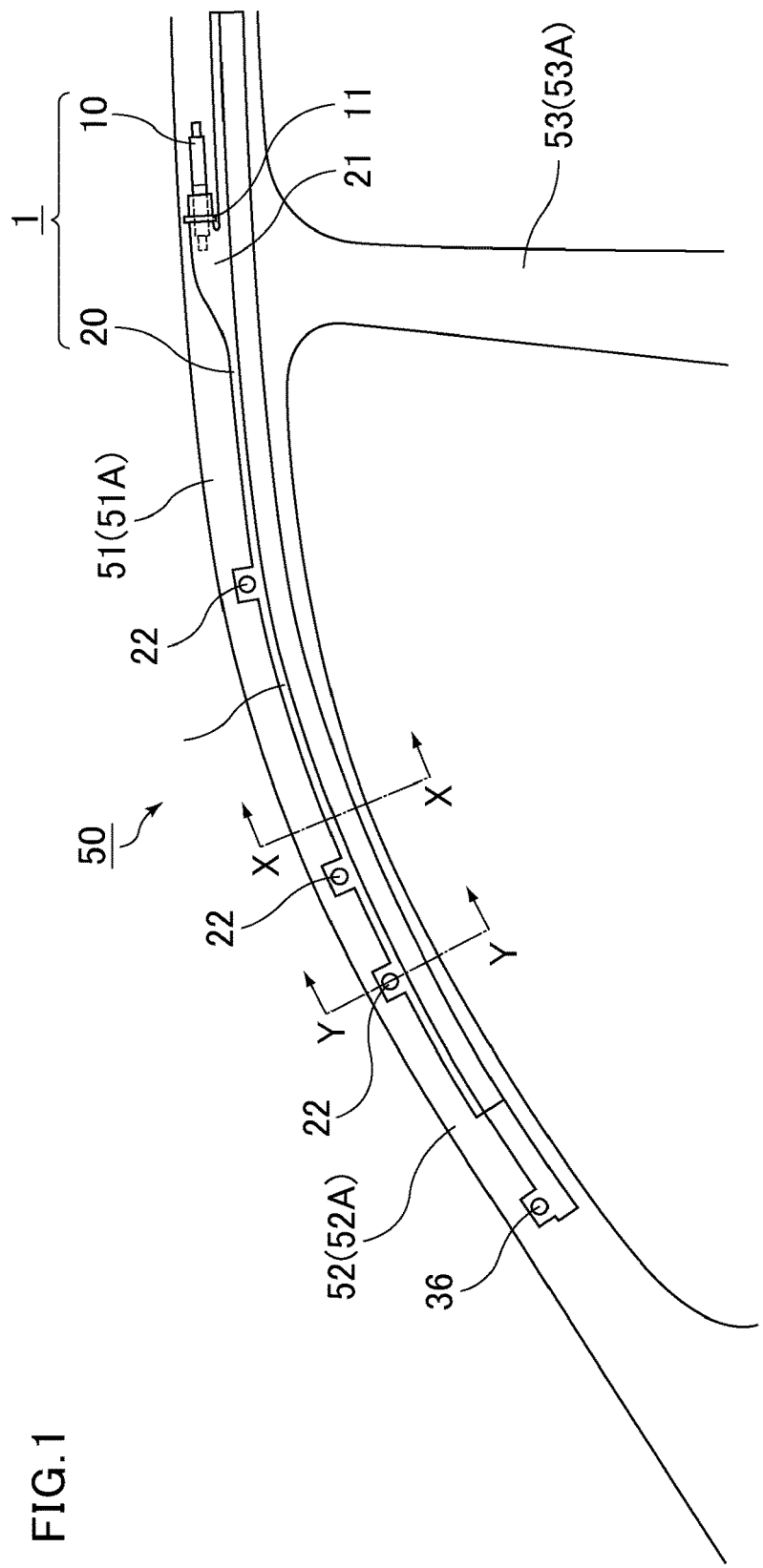
FIG. 1 is a view of a sidewall of a vehicle observed straight from an interior side of the vehicle, schematically showing an initial state of a curtain airbag device of an embodiment mounted on the vehicle.

FIG. 1 is a view of a sidewall of a vehicle observed straight from an interior side of the vehicle, schematically showing an initial state of a curtain airbag device of an embodiment mounted on the vehicle. A curtain airbag device 1 in the initial state is stored in a space formed between an interior side of a sidewall of a vehicle 50 and an interior member (i.e., storage portion on the sidewall of the vehicle) so as to be hidden from occupants inside the vehicle. In FIG. 1, for simplification of explanation, the curtain airbag device 1 is illustrated as if it is observable. Here, the rear part and the lower part of the sidewall of the vehicle 50 are omitted in FIG. 1. The "initial state" refers to a state before an airbag 20 begins to be inflated and deployed.

The curtain airbag device 1 is stored in an interior member on an upper side of the vehicle interior side of the sidewall of the vehicle 50. The sidewall of the vehicle 50 may include any parts of the vehicle positioned beside an occupant seated in a vehicle seat and collectively refers to members including side doors, pillars, and side windows. As shown in FIG. 1, the vehicle interior side of the sidewall of the vehicle 50 includes a roof side rail 51 on the upper side, a front pillar (A pillar) 52 in a front part of the vehicle, a center pillar (B pillar) 53 in a center part of the vehicle, and a rear pillar (C pillar) (not illustrated) in a rear part of the vehicle. Herein, a portion of the sidewall above the center of the front pillar 52 is referred to as an upper side of the sidewall while a portion of the sidewall below the center of the front pillar 52 is referred to as a lower side of the sidewall.

The interior member may be any member that covers the interior side of the sidewall of the vehicle 50. Examples thereof include a ceiling member 51A covering the roof side rail 51, a front pillar trim 52A covering the front pillar 52, a center pillar trim 53A covering the center pillar 53, and a rear pillar trim (not illustrated) covering the rear pillar.

The curtain airbag device 1 includes an inflator 10 configured to generate a gas, an airbag (curtain airbag) 20, and a band-like or string-like restricting member (tether) connecting the airbag 20 and the sidewall of the vehicle 50. The restricting member (tether) is folded together with the airbag 20, and thus only a tip portion 36 at an end of the restricting member used for connection to the sidewall of the vehicle 50 is illustrated in FIG. 1.

The inflator 10 is a cylindrical (columnar) gas generator including a gas injection nozzle at its end in the longitudinal direction of the vehicle. The gas injection nozzle is inserted into a gas inlet portion 21, sewn to have a tubular shape, of the airbag 20. A gas generated by the inflator 10 is introduced into the airbag 20 through the gas injection nozzle of the inflator 10 and the gas inlet portion 21 of the airbag 20. The gas inlet portion 21 is tightened together with the inflator 10 inserted therein by a band 11 such that the gas does not leak out. The inflator 10 is attached to the roof side rail 51 above the center pillar 53. The gas inlet portion 21 of the airbag 20 is formed at an upper edge of the airbag 20 (at an upper end in the height direction of the vehicle). Since the gas inlet portion 21 is situated near the center of the vehicle 50 in the front-rear direction, flows of the gas from near the center of the vehicle 50 toward the front end and toward the rear end in the front-rear direction are generated in the airbag 20.

The inflator 10 is activated in an emergency of the vehicle 50 (mainly in a side collision). For example, when an impact sensor mounted on the vehicle 50 detects a side collision, the sensor transmits a signal to ECU and the ECU calculates and determines the collision level. In the case where the determined collision level corresponds to a level at which the airbag 20 should be inflated, the inflator 10 is ignited to generate a gas through a chemical reaction by combustion.

The airbag 20 is a bag body situated such that its longitudinal direction is along the roof side rail 51, the front pillar 52, and the rear pillar. The airbag 20 in the initial state is folded in a rod-like shape and stored in a state of being wrapped by a wrapping material (not illustrated) that is breakable upon inflation. In an emergency of the vehicle 50, the gas generated by the inflator 10 is introduced into the airbag 20 such that the airbag 20 is inflated while unfolded. The airbag 20 presses the interior member to push open it while being inflated, comes down to the interior space of the vehicle while being further inflated, and is deployed in the shape of a curtain along the interior side of the sidewall of the vehicle toward the lower part of the vehicle 50. The inflated and deployed airbag 20 covers the vehicle interior side of the sidewall including windows in the front-rear direction of the vehicle 50, protecting occupants in the vehicle, mainly the heads of the occupants.

Figure 2:
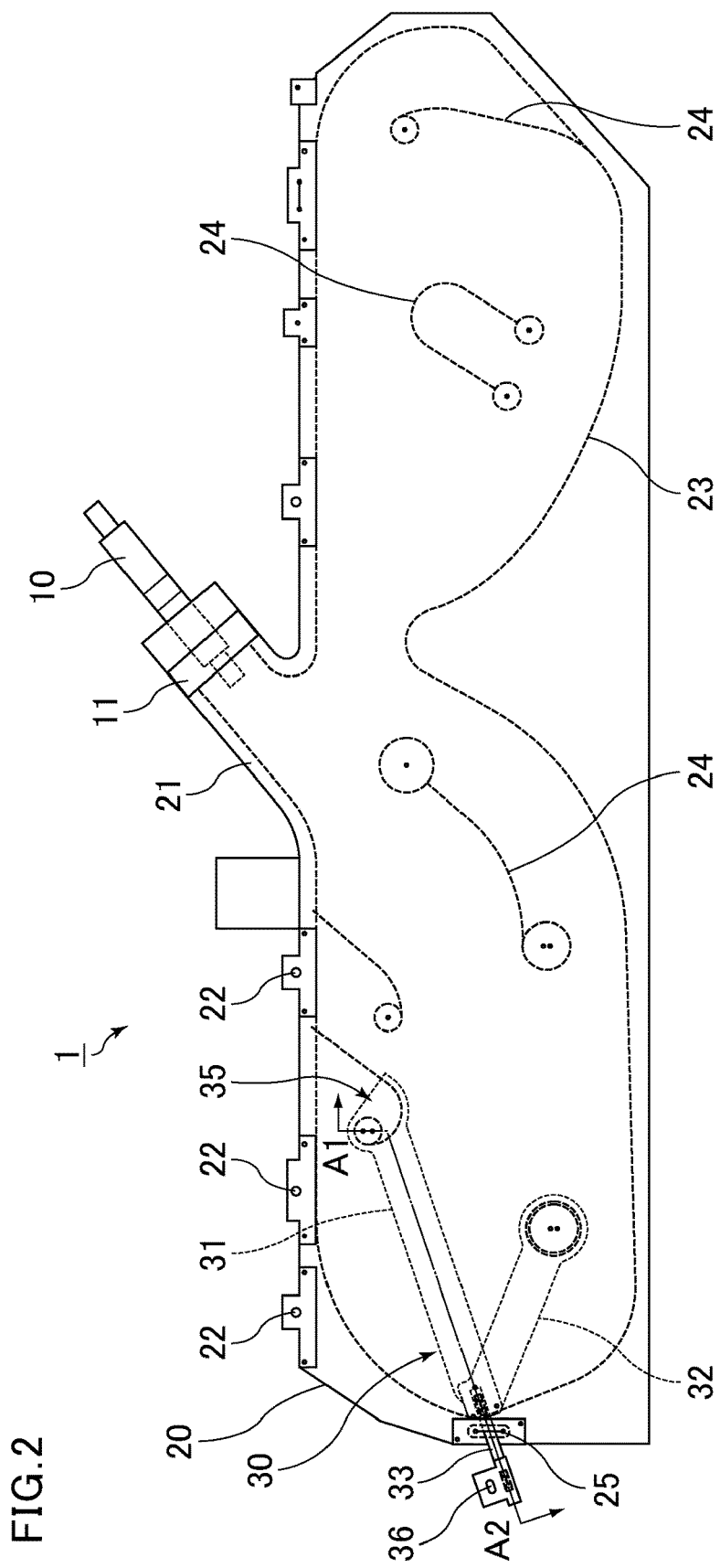
FIG. 2 is a view schematically showing the curtain airbag device shown in FIG. 1 in a deployed state.
Figure 3:
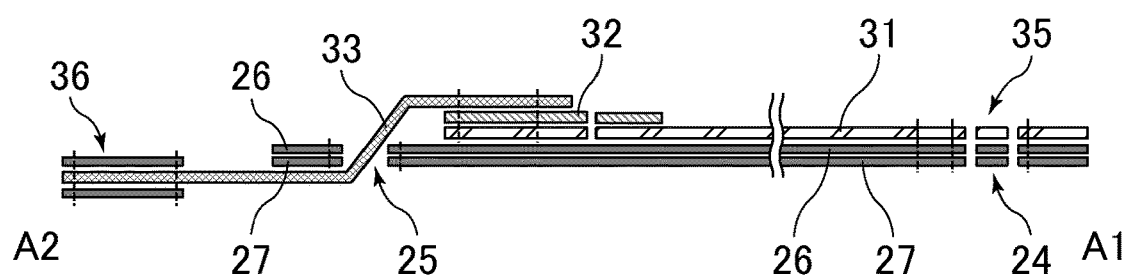
FIG. 3 is a view schematically showing cross sections of a restricting member and the airbag taken along the A1-A2 line in FIG. 2.

FIG. 2 is a view schematically showing the curtain airbag device shown in FIG. 1 in a deployed state. FIG. 3 is a view schematically showing cross sections of a restricting member 30 and the airbag 20 taken along the A1-A2 line in FIG. 2. The airbag 20 is formed into a bag body by joining a vehicle exterior side base fabric 26 and a vehicle interior side base fabric 27 at an outer circumferential joining portion 23. In the curtain airbag device 1 mounted on the vehicle 50, the base fabric in the exterior side of the vehicle, i.e., the base fabric adjacent to the sidewall of the vehicle, is the vehicle exterior side base fabric 26, and the base fabric in the interior side of the vehicle is the vehicle interior side base fabric 27. The vehicle exterior side base fabric 26 and the vehicle interior side base fabric 27 can be formed of, for example, nylon 66 yarn or polyethylene terephthalate (PET) yarn. In order to improve the heat resistance and the airtightness, the surfaces of the vehicle exterior side base fabric 26 and the vehicle interior side base fabric 27 may be covered with a material such as silicone. The vehicle exterior side base fabric 26 and the vehicle interior side base fabric 27 may be separate base fabrics or may be opposite parts of one base fabric folded in half.

The outer circumferential joining portion 23 is a portion where the vehicle exterior side base fabric 26 and the vehicle interior side base fabric 27, except for the portion corresponding to the gas inlet portion 21, are joined along the circumferences thereof such that the resulting bag body has airtightness. The outer circumferential joining portion 23 defines the outer circumferential shape of the inflated portion of the airbag 20. Examples of the joining method herein include, without limitation, sewing, adhesion, welding, and combinations thereof. Since airtightness and joining strength are required in joining along the outer circumferential joining portion 23, combination use of sewing and adhesion is preferred.

In a region surrounded by the outer circumferential joining portion 23 between the gas inlet portion 21 and the end portions of the bag body (airbag 20) in the longitudinal direction of the vehicle, joining portions 24 are formed where the vehicle exterior side base fabric 26 and the vehicle interior side base fabric 27 are joined. The joining portions 24 can partially restrict the thickness of the inflated airbag 20 in the width direction of the vehicle and control the inflation shape of the airbag 20. This configuration allows adjustment of the internal volume and thickness of the airbag 20 in an inflated state, improving the performance of protecting occupants. Meanwhile, the joining portions 24 and the neighboring portions do not allow the gas to pass therethrough smoothly during inflation and deployment of the airbag 20. With restricted flow of the gas from the gas inlet portion 21 toward the end portions of the bag body in the longitudinal direction of the vehicle, the lower part (roll folding portion) of the airbag 20 adjacent to the gas inlet portion 21 is inflated while the upper part (flip folding portion) of the airbag 20 cannot be sufficiently inflated. In this case, in a conventional curtain airbag device, the airbag 20 may possibly be stuck to the storing portion on the sidewall of the vehicle and may not readily come down. In contrast, the curtain airbag device 1 of the present embodiment can control the shape and position of the airbag 20 during inflation and deployment with the restricting member 30 to allow the airbag 20 to appropriately push open the interior member.

To the upper edge of the airbag 20 is joined fixing fabric pieces (tabs) 22 such that the tabs 22 protrude from the upper edge of the airbag 20. The tabs 22 are fixed to the roof side rail 51 and the front pillar 52 with bolts or clips. The airbag 20 is also provided with an opening (slit) 25 through which the restricting member 30 is passed, on an end portion side thereof in the longitudinal direction of the vehicle relative to the region surrounded by the outer circumferential joining portion 23.

The restricting member 30 is a string-like member connecting the airbag 20 and the sidewall of the vehicle, and includes a base end portion 35 joined to the vehicle exterior side base fabric 26 and a tip portion 36 fixed to the lower side of the front pillar 52. The string-like member has a linear overall shape with a first tether 31 and a third tether 33 connected to each other. The string-like member has the base end portion 35 at one end thereof adjacent to the first tether 31 and the tip portion 36 at the other end thereof adjacent to the third tether 33. To a connection portion of the first tether 31 and the third tether 33 may be attached a second tether 32. The tip portion may be fixed to any member other than the front pillar 52, such as the rear pillar in the rear part of the vehicle. Since the airbag 20 is connected to the front pillar 52, which is part of the sidewall, by the restricting member 30, the restricting member 30 in which tension is generated upon inflation of the airbag 20 can control the inflation shape of the airbag 20 and movement of the airbag 20 in the front-rear direction of the vehicle. Also, the restricting member 30 is joined to the vehicle exterior side base fabric 26 at the base end portion 35, and therefore can keep the inflated airbag 20 from protruding out or moving toward the exterior side of the vehicle. The restricting member 30 may be formed of any material, but is preferably formed of a material with high strength and low elongation. The first tether 31, the second tether 32, and the third tether 33 may be formed of the same or different materials. Examples of the material of the restricting member 30 include a silicone-coated cloth obtained by siliconizing the surface of a cloth woven from nylon 66 yarn or polyethylene terephthalate (PET) yarn, for example.

As shown in FIG. 3, the base end portion 35 of the restricting member 30 is joined to one of the joining portions 24 of the airbag 20. This configuration increases the strength of the base end portion 35 of the restricting member 30 in which tension is generated. The configuration is also advantageous in terms of the productivity because it allows attachment of the restricting member 30 simultaneously with formation of the joining portion 24. Sewing is suited to joining the restricting member 30. In the case of joining the base end portion 35 of the restricting member 30 and the joining portion 24 of the airbag 20 as shown in FIG. 3, three cloths, namely the restricting member 30 (first tether 31), the vehicle exterior side base fabric 26, and the vehicle interior side base fabric 27, are sewn together.

The restricting member 30 is passed through the opening 25 formed at an end portion of the airbag 20 in the longitudinal direction of the vehicle. The restricting member 30, passed through the opening 25, can accurately restrict the position and shape of the airbag 20 during inflation while allowing a certain degree of freedom for inflation and movement of the airbag 20.

Figure 5:
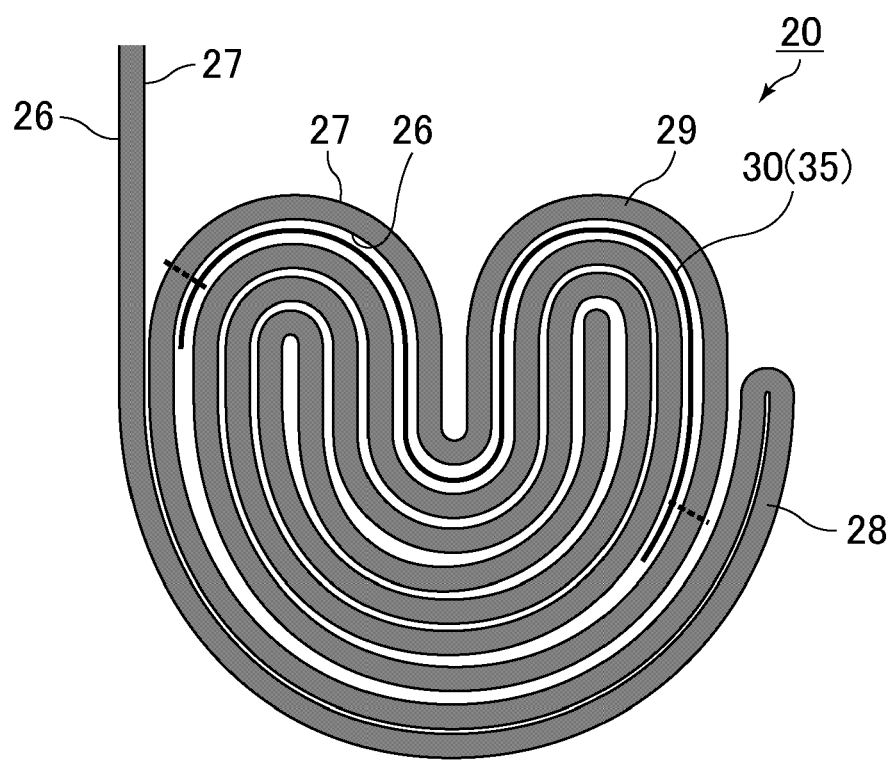
FIG. 5 is a view of the airbag of the embodiment observed from the front-rear direction of the vehicle, schematically showing a cross section of the airbag in the folded state for storage.
Figure 6:
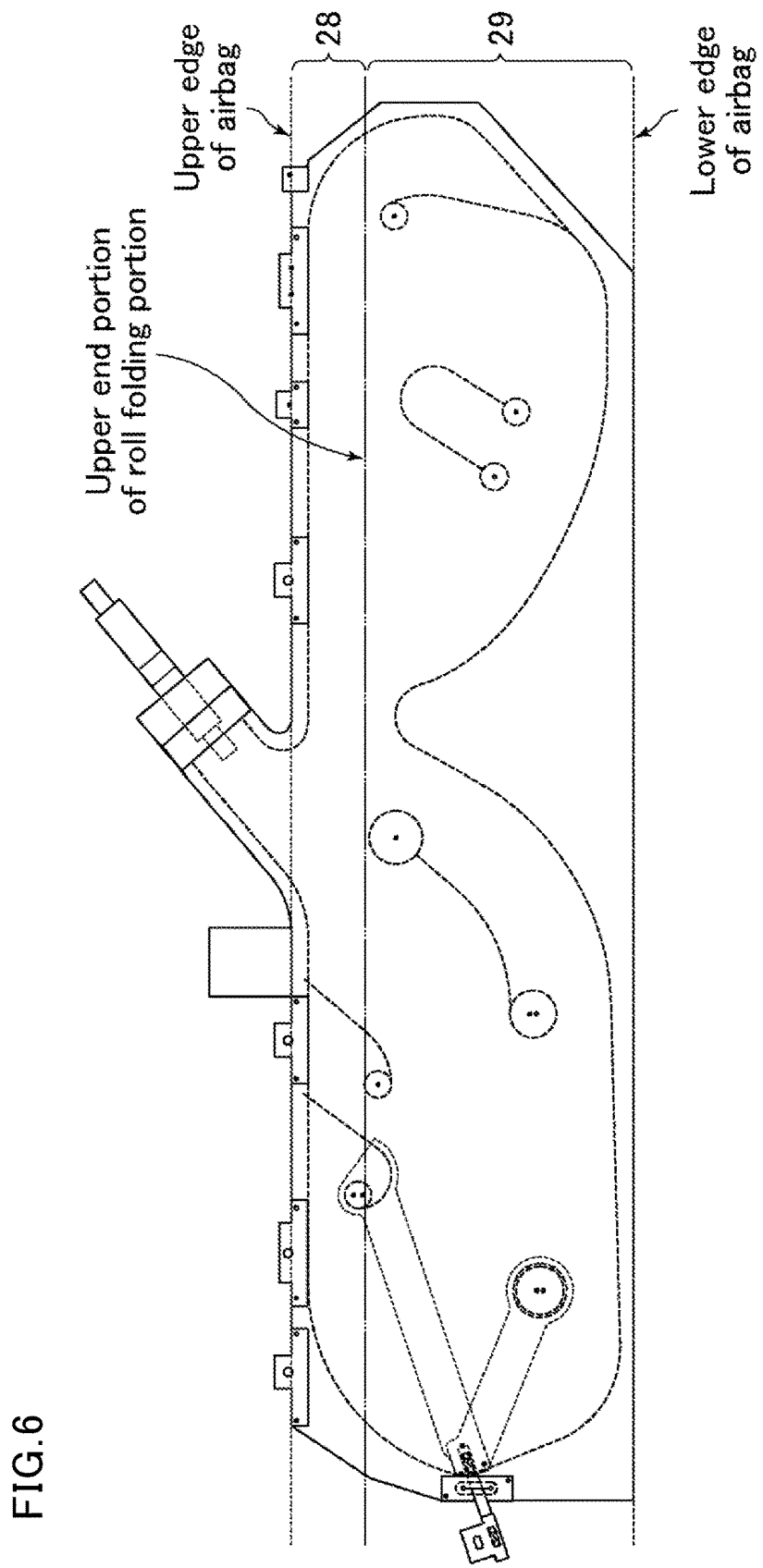
FIG. 6 is a view of the airbag of the embodiment in the deployed state, showing the positions of a roll folding portion and a flip folding portion that are formed during storage.

Next, how the airbag 20 in the initial state, i.e., the airbag 20 during storage, is folded is described. FIG. 4 shows views of the airbag 20 of the embodiment observed from a front-rear direction of the vehicle, schematically showing the order of folding the airbag into a folded state for storage. FIG. 5 is a view of the airbag 20 of the embodiment observed from the front-rear direction of the vehicle, schematically showing a cross section of the airbag 20 in the folded state for storage. FIG. 6 is a view of the airbag 20 of the embodiment in the deployed state, showing the positions of a roll folding portion and a flip folding portion that are formed during storage.

The airbag 20 shown in FIG. 5 is obtained by folding the airbag 20 through the following steps (A) to (D).

Figure 4A:
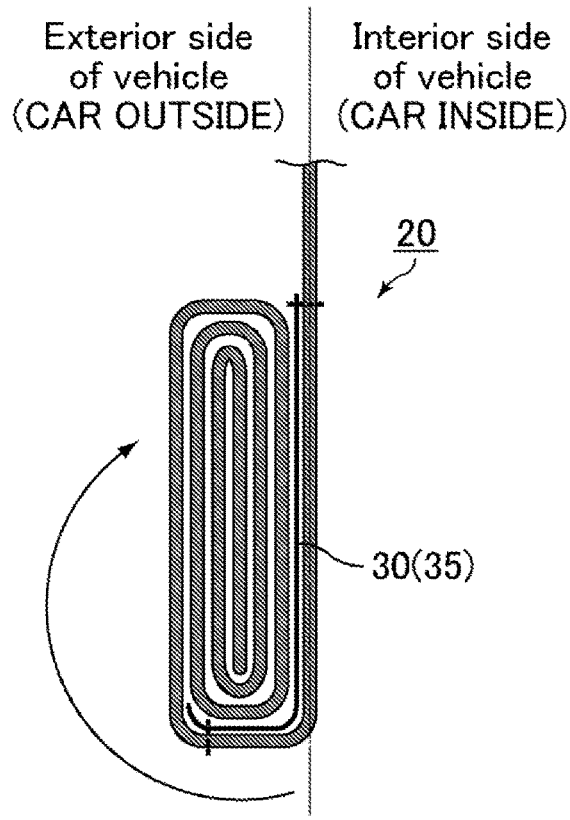
FIGS. 4A, 4B, 4C and 4D are views of the airbag of the embodiment observed from a front-rear direction of the vehicle, schematically showing the order of folding the airbag into a folded state for storage.

(A) As shown in FIG. 4A, the airbag 20, which is a bag body, is folded multiple times (e.g., six times) such that the bag body is wound into a roll shape in the direction from the lower edge to the upper edge toward the exterior side of the vehicle with the vehicle interior side base fabric 27 facing outside.

Figure 4B:
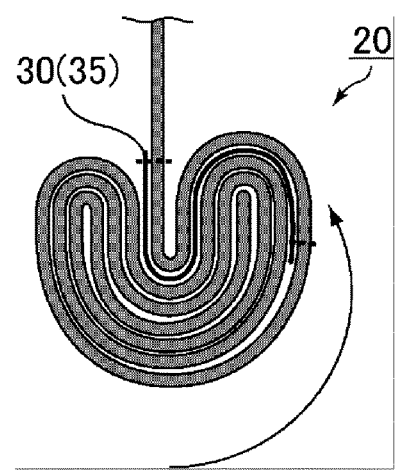

(B) As shown in FIG. 4B, the lower half of the wound roll is folded in the direction opposite to the winding direction of the roll (i.e., toward the interior side of the vehicle), to give a U-shaped cross section to the airbag 20.

Figure 4C:
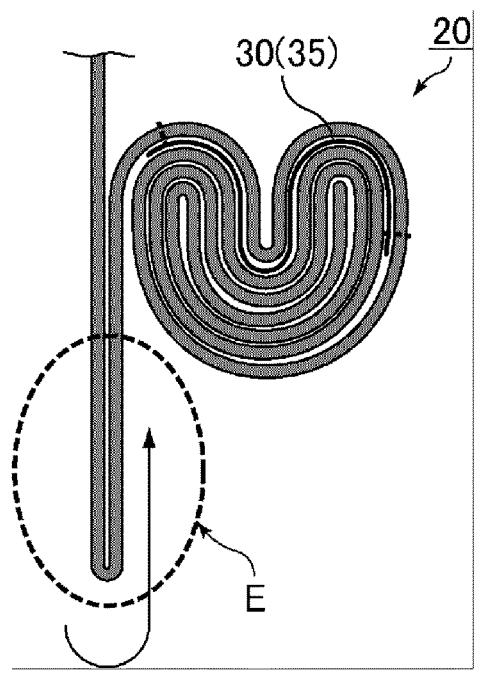

(C) As shown in FIG. 4C, the airbag 20 having the U-shaped cross section is accordion-folded once toward the interior side of the vehicle, forming an extra-folding portion E.

Figure 4D:
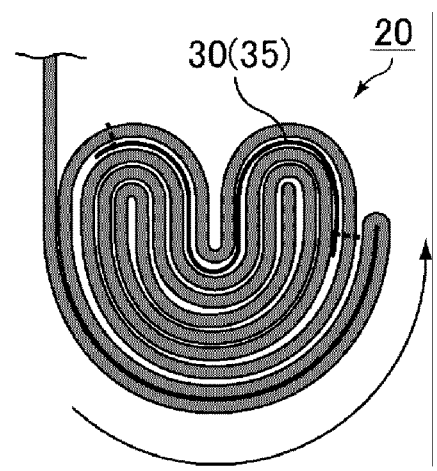

(D) As shown in FIG. 4D, the extra-folding portion E shown in FIG. 4C is wound onto the lower part of the roll folded in the U shape.

As described above, the airbag 20 is folded into a roll shape such that the vehicle interior side base fabric 27 faces outside, and the airbag 20 is folded back such that the vehicle interior side base fabric 27 faces inside, whereby the folded state is obtained in which a flip folding portion (accordion folding portion) 28 is disposed outside a roll folding portion 29. The thus-obtained airbag 20 in a folded state is, as shown in FIG. 5, a bag body that includes the roll folding portion 29 formed by folding the airbag 20 into a roll shape in the direction from the lower edge of the airbag 20 to the upper edge thereof with the vehicle interior side base fabric 27 facing outside, and the flip folding portion 28 formed by folding back the airbag 20 with the vehicle interior side base fabric 27 facing inside between the roll folding portion 29 and the upper edge of the airbag 20. The flip folding portion 28 may be any portion folded back such that the vehicle interior side base fabric 27 faces inside. The number of times of folding back may be one, or two or more, for example. The flip folding portion 28 is rapidly inflated and deployed as being unfolded from a portion into which the gas has been flown, whereas the roll folding portion 29 is difficult to be unfolded as compared with the flip folding portion 28 because the downstream of the gas is at the center of the roll folding portion 29. Accordingly, in the initial state of the inflation and deployment of the airbag 20 of the present embodiment, the flip folding portion 28 provided at the upper edge, except for the joining portions 24 and the neighboring portions, can be inflated and deployed. Thereby, the upper edge of the airbag 20 serves as a passage of the gas, and thus can be inflated in an early stage sequentially from its side adjacent to the gas inlet portion 21 (upstream of the gas) toward its side remote from the gas inlet portion 21 (downstream of the gas).

To an upper end portion of the roll folding portion 29 of the airbag 20 is joined the base end portion 35 of the restricting member 30. The roll folding portion 29 is folded into a roll shape such that the vehicle interior side base fabric 27 faces outside. The base end portion 35 of the restricting member 30 is, as described above, attached to the airbag 20 via the vehicle exterior side base fabric 26. Hence, in a cross-sectional view of the airbag 20 folded together with the base end portion 35 of the restricting member 30, as shown in FIG. 5, the restricting member 30, the vehicle exterior side base fabric 26, and the vehicle interior side base fabric 27 are disposed in the given order from the inside of the roll folding portion 29, with the restricting member 30 being adjacent to a portion of the roll folding portion 29 disposed inside relative to the restricting member 30. The base end portion 35 of the restricting member 30 may be joined to the flip folding portion 28.

Upon introduction of the gas from the gas inlet portion 21 to the inside of the airbag 20, the airbag 20 is inflated and deployed downward. At this time, since the airbag 20 in the initial state is folded as described above, the airbag 20 with the roll folding portion 29 kept in the folded state is pushed by the restricting member 30 toward the interior side of the vehicle, so that the airbag 20 pushes open the interior member and is then inflated and deployed. This allows the airbag 20 to be smoothly inflated and deployed without being stuck to the interior member, protecting the heads of occupants without fail. This deploying behavior of the airbag 20 (up to full deployment of the airbag 20) is described in detailed below with reference to FIGS. 7 and 8.

FIG. 7 shows cross sections of the airbag 20 taken along the X-X line in FIG. 1; FIGS. 7A to 7D show inflation and deployment of the airbag 20 in time series. Each cross section in FIG. 7 shows the position where the base end portion 35 of the restricting member 30 is fixed to the airbag 20. FIG. 8 shows cross sections of the airbag 20 taken along the Y-Y line in FIG. 1; FIGS. 8A to 8D show inflation and deployment of the airbag 20 in time series. Each cross section in FIG. 8 shows the position where the fixing fabric pieces 22 of the airbag 20 are fixed to the front pillar 52.

Figure 7A:
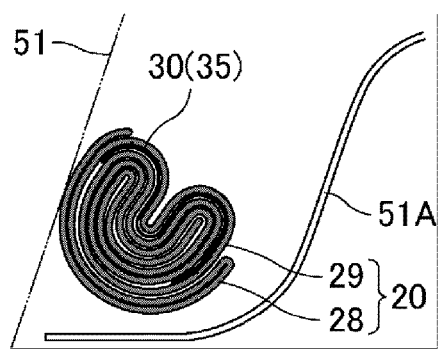
FIGS. 7A, 7B, 7C and 7D show cross sections of the airbag taken along the X-X line in FIG. 1.
Figure 8A:
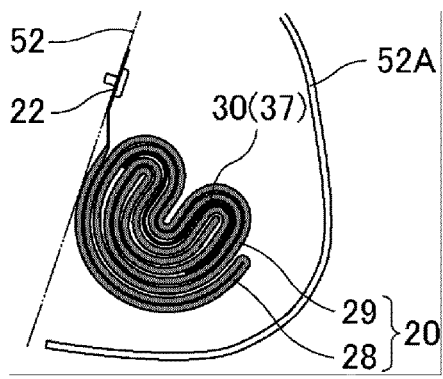
FIGS. 8A, 8B, 8C and 8D show cross sections of the airbag taken along the Y-Y line in FIG. 1.

As shown in FIG. 7A and FIG. 8A, the folded airbag 20 in the initial state is stored in a space between the sidewall of the vehicle 50 and the interior members, namely the ceiling member 51A and the front pillar trim 52A. The space is a storage portion on the sidewall of the vehicle.

Upon introduction of the gas from the inflator 10 to the gas inlet portion 21 at the upper edge of the airbag 20, the upper end portions of the flip folding portion 28 and the roll folding portion 29 (outer circumferential portions of the roll) are inflated and unfolded, in the upstream of the gas relative to the position where the base end portion 35 of the restricting member 30 is joined to the airbag 20. The unfolded portion of the airbag 20 pushes open the ceiling member 51A covering the airbag 20, thereby forming an opening leading from the storage portion to the interior space of the vehicle. Thereafter, the airbag 20 is deployed into the interior space of the vehicle through the push-opened opening, followed by sequential inflation of the roll folding portion 29 from the outer circumferential portion of the roll toward the center of the roll.

As the airbag 20 is inflated and deployed from the gas inlet portion 21 (upstream) toward the end portions of the airbag 20 in the longitudinal direction of the vehicle (downstream), the portion around the position where the base end portion 35 of the restricting member 30 is fixed to the airbag 20 begins to be inflated. Here, the increase in thickness of the inflated airbag 20 in the upstream of the gas (length of the airbag 20 in the width direction of the vehicle) is accompanied by a decrease in apparent length of the airbag 20 in the longitudinal direction of the vehicle. As a result, the restricting member 30 whose tip portion 36 is fixed to the lower side of the sidewall of the vehicle is pulled toward the gas inlet portion 21 (toward the upstream of the gas) by the base end portion 35 fixed to the airbag 20. In this manner, the change in shape of the airbag 20 caused by inflation in the upstream involves generation of tension in the restricting member 30.

Figure 7B:
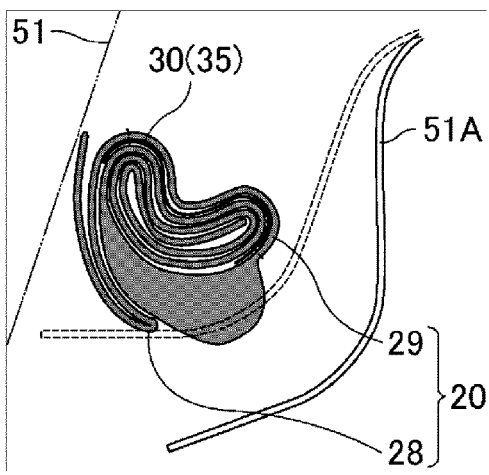
Figure 8B:
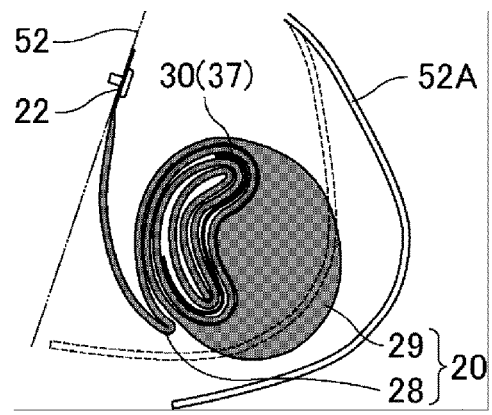

FIG. 7B and FIG. 8B show the states where the airbag 20, in inflation and deployment, begins to be inflated and deployed into the interior space of the vehicle by pushing open the ceiling member 51A and the front pillar trim 52A. The state in FIG. 7B showing a portion adjacent to the gas inlet portion 21 (upstream of the gas) corresponds to 10 to 12 ms after activation of the inflator 10. The state in FIG. 8B showing a portion remote from the gas inlet portion (downstream of the gas) corresponds to 17 to 19 ms after the activation of the inflator 10.

The tension generated in the restricting member 30 pulled toward the upstream of the gas upon inflation and deployment of the airbag 20 loosens the folding of the restricting member 30 as shown in FIG. 7B. The restricting member 30, fixed to the vehicle exterior side base fabric 26, then pushes the roll folding portion 29 kept in the folded state which is disposed inside relative to the restricting member 30. The airbag 20 under the force from the restricting member 30 pushes open the ceiling member 51A to move into the interior space of the vehicle.

Meanwhile, a portion of the airbag 20 in the downstream of the gas shown in FIG. 8A, in which the restricting member 30 is still folded together with the roll folding portion 29 in the stage immediately after generation of the tension in the restricting member 30, is pulled toward the upstream of the gas in the same state (no appearance change). At this time, the restricting member 30, connected to the sidewall of the vehicle 50 by the tip portion 36, moves relative to the roll folding portion 29 in the front-rear direction of the vehicle. In addition, tension is generated in the restricting member 30 between the base end portion 35 attached to the outer circumferential portion of the roll folding portion 29 and the tip portion 36 passed inside the roll folding portion 29. This causes the restricting member 30 to be tightly wound. Thereafter, the portion of the airbag 20 in the downstream of the gas shown in FIG. 8B finally begins to be inflated. Here, the restricting member 30 fixed to the vehicle exterior side base fabric 26 presses (tightly winds) the roll folding portion 29 kept in the folded state, which is disposed inside relative to the restricting member 30, toward the inside of the folded roll. The airbag 20 having begun to be inflated pushes open the front pillar trim 52A to move into the interior space of the vehicle, with the roll folding portion 29 in a compact state.

Figure 7C:
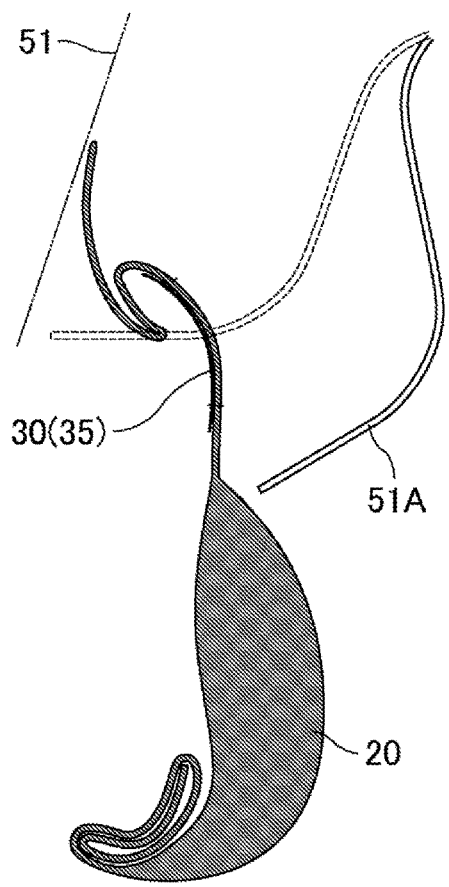
Figure 8C:
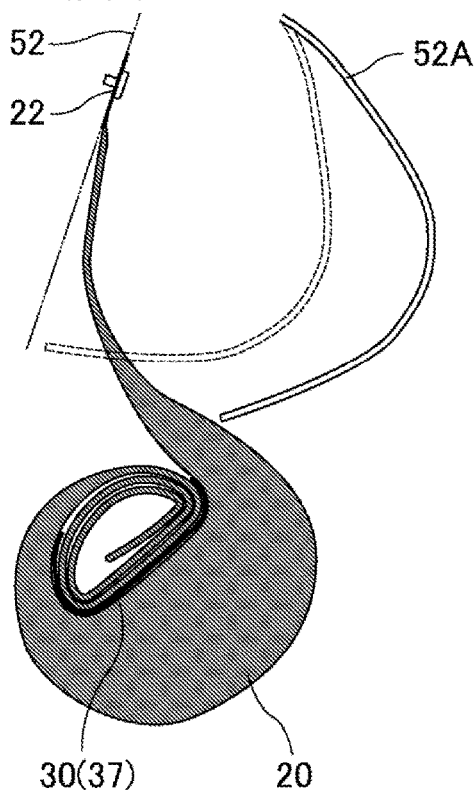

The airbag 20 come down from the storage portion on the sidewall of the vehicle is further inflated and deployed in the interior space of the vehicle as shown in FIG. 7C and FIG. 8C, so that the roll folding portion 29 is further unfolded. FIG. 7C and FIG. 8C show the states where the airbag 20 is inflated and deployed into a curtain-like shape in the interior space of the vehicle. The state in FIG. 7C showing a portion adjacent to the gas inlet portion 21 (upstream) corresponds to 17 to 19 ms after the activation of the inflator 10. The state in FIG. 8C showing a portion remote from the gas inlet portion 21 (downstream) corresponds to 18 to 20 ms after the activation of the inflator 10. Since the tension has been generated in the restricting member 30, the inflated airbag 20 is pushed toward the interior side of the vehicle and the deployment position of the airbag 20 is controlled.

Figure 7D:
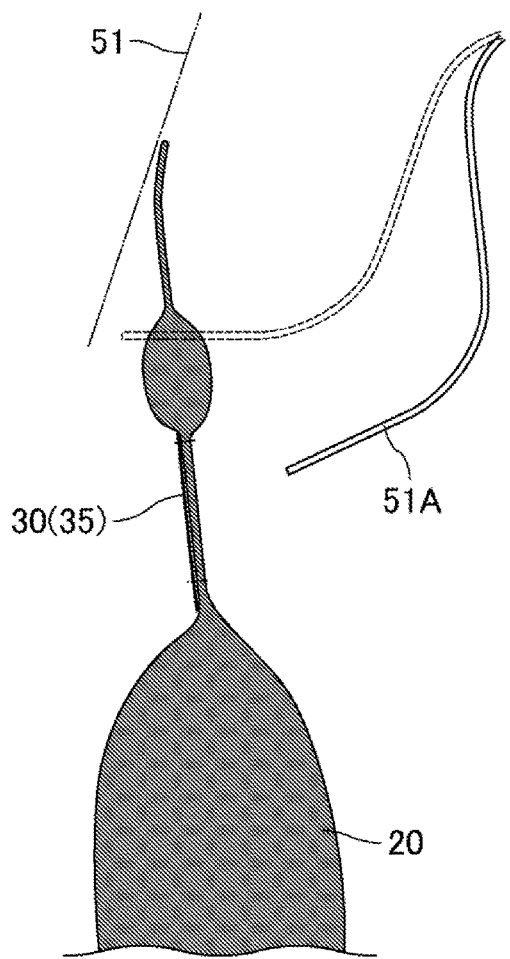
Figure 8D:
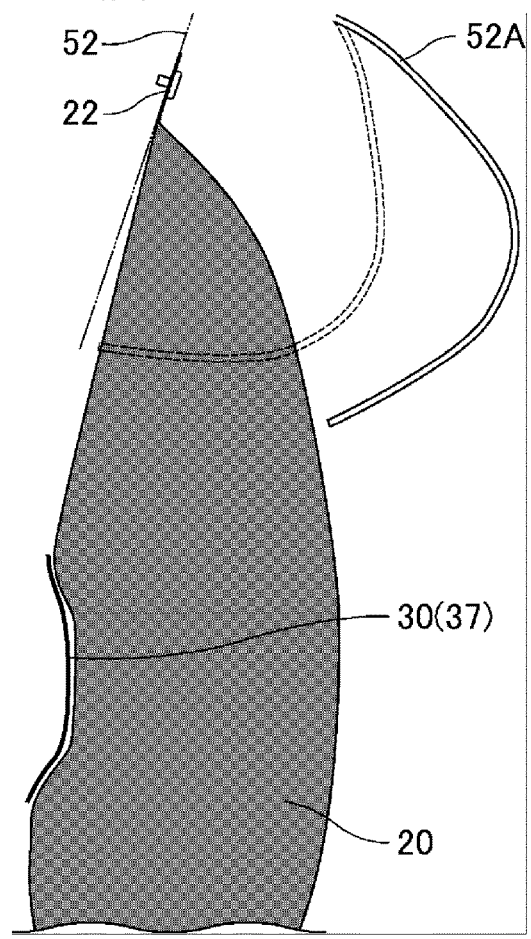

Upon completion of the inflation and deployment, the airbag 20 is in the state shown in FIG. 7D and FIG. 8D. The states in FIG. 7D and FIG. 8D each correspond to 27 to 29 ms after the activation of the inflator 10. As described above, in the present embodiment, since the deploying behavior of the airbag 20 (up to full deployment of the airbag 20) is controlled by the method for folding the airbag 20 and the restricting member 30, the inflation and deployment of the airbag 20 can be completed at an appropriate timing without the airbag 20 being stuck to the ceiling member 51A and the front pillar trim 52A.

In the present embodiment, while the airbag 20 is in the folded state, the restricting member 30 preferably includes, between the base end portion 35 and the tip portion 36, a middle portion 37 folded together with the roll folding portion 29. The inflated airbag 20 in the upstream relative to the middle portion 37 of the restricting member 30 presses the restricting member 30 toward the exterior side of the vehicle, which generates force against the pushing, i.e., tension toward the interior side of the vehicle, in the restricting member 30. Here, the tension causes tight winding in the middle portion 37 of the restricting member 30 folded together with the roll folding portion 29, since the tension generates toward the inside of the roll folding portion 29 in the middle portion 37 while the middle portion 37 is wound inside the roll folding portion 29. In contrast, when the roll folding is loosened and the middle portion 37 of the restricting member 30 is released from the winding of the roll, tension toward the interior side of the vehicle is generated in the middle portion 37 by the above mechanism. Accordingly, while the middle portion 37 of the restricting member 30 is wound inside the roll folding portion 29, the restricting member 30 in which tension is generated pushes the roll folding portion 29 at a relatively inside position and controls inflation of the roll folding portion 29 and the deployment direction of the roll folding portion 29. At this time, the restricting member 30 does not restrict inflation of the vehicle exterior side base fabric 26 and the vehicle interior side base fabric 27 which are adjacent to the outer circumference relative to the middle portion 37 of the restricting member 30. With this configuration, inflation of the airbag 20 loosens folding of the roll, thereby releasing the restricting member 30 from the winding of the roll.

As described above, the middle portion 37 of the restricting member 30 folded together with the roll folding portion 29 pushes the roll-folded portion, disposed inside relative to the middle portion 37, toward the inside of the roll. Hence, the deployment (movement) position of the roll folding portion 29 is controlled by the restricting member 30 in which tension has been generated and thus the position is made stable in the vehicle 50. Thereby, the airbag 20 can protect the heads of occupants with a high degree of certitude.

In the present embodiment, the base end portion 35 of the restricting member 30 is preferably attached to one of the joining portions 24 of the airbag 20. With the base end portion 35 of the restricting member 30 attached to the joining portion 24 of the airbag 20, the base end portion 35 can function to reduce the inflation size (thickness) in the storage portion on the sidewall of the vehicle when the airbag 20 is inflated, so that the airbag 20 can be inflated and deployed from the storage portion toward the interior side of the vehicle smoothly. Also, while the airbag 20 increases in its thickness in the width direction of the vehicle as it is inflated into a spherical shape, the restricting member 30, upon the inflation, moves to stretch out straight from the base end portion 35 to the tip portion 36 at the shortest distance. Since the base end portion 35 of the restricting member 30 is attached to the joining portion 24 of the airbag 20, the tension generated in the middle portion 37 of the restricting member 30 can be increased.

In the present embodiment, preferably, the airbag 20 is provided with the opening 25 on the end portion side thereof in the longitudinal direction of the vehicle relative to the region surrounded by the outer circumferential joining portion 23, and the restricting member 30 is passed through the opening 25. The restricting member 30 passed through the opening 25 provided in the airbag 20 can restrict the airbag 20 from moving away from the restricting member 30 when the airbag 20 is inflated into a spherical shape. This configuration can increase the tension generated in the restricting member 30. As shown in FIG. 2 and FIG. 3, the opening 25 may be a slit penetrating the vehicle exterior side base fabric 26 and the vehicle interior side base fabric 27 at the outer edge of the airbag 20 or a space formed by a strip-like member (belt) whose edges are joined to the vehicle exterior side base fabric 26. Although only one opening 25 is formed in the present embodiment, there may be multiple openings 25.

The present embodiment in which the inflated airbag 20 is deployed restrictedly in the interior side of the vehicle is also expected to enhance the performance of protecting the heads of occupants in an oblique collision. In an oblique collision such as small overlap impact, the front pillar 52 may significantly be damaged or the airbag 20 during inflation and deployment may be further inflated and deployed toward the exterior side of the vehicle by inertial force generated in the oblique collision. In such a case, the lower edge of a conventional airbag may move toward the exterior side of the vehicle over the belt line (upper edge of the door trim) (i.e., may go out through the window). The airbag 20 of the present embodiment, in contrast, is configured to be deployed toward the interior side of the vehicle, and is thus capable of appropriately protecting the heads of occupants even in an oblique collision.

The above embodiment is not intended to limit the scope of the present invention. The configurations in the embodiment may appropriately be deleted, supplemented, modified, and/or combined within the spirit of the present invention.

Figure 9:
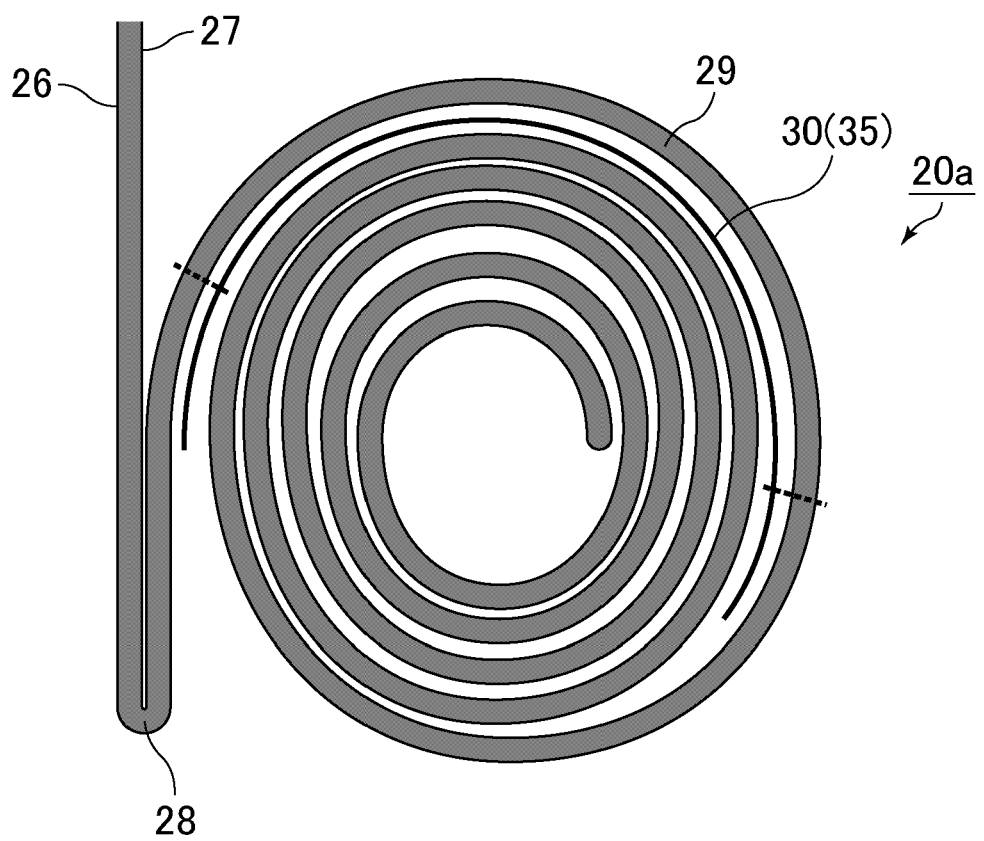
FIG. 9 is a view of an airbag of a modified example observed from the front-rear direction of the vehicle, schematically showing a cross section of the airbag in a folded state for storage.

For example, the airbag 20 may have a cross section as shown in FIG. 9 in a folded state. FIG. 9 is a view of an airbag 20a of a modified example observed from the front-rear direction of the vehicle, schematically showing a cross section of the airbag in a folded state for storage. As shown in FIG. 9, the flip folding portion (accordion folding portion) 28 may not be wound onto the lower part of the roll. The roll folding portion 29 may not be folded in a U shape. As with the case of the configuration of the airbag 20 of the embodiment, the configuration of the airbag 20a of the modified example as shown in FIG. 9 can achieve the effect of causing the airbag 20a, having begun to be inflated, to come down from the storage portion on the sidewall of the vehicle without fail and then inflating and deploying the airbag 20a in the interior space of the vehicle.

What is claimed is:

1. A curtain airbag device stored in an interior member on an upper side of a sidewall of a vehicle, comprising:
    an inflator configured to generate a gas;
    an airbag that is a bag body stored in a folded state and is configured to be inflated and deployed downward from the upper side of the sidewall of the vehicle by the gas; and
    a restricting member connecting the airbag and the sidewall of the vehicle,
    the airbag comprising
        an outer circumferential joining portion joining a vehicle exterior side base fabric and a vehicle interior side base fabric, thereby forming the bag body,
        a gas inlet portion which is arranged at an upper edge of the airbag and into which the gas is to be introduced, and
        a joining portion which is arranged in a region surrounded by the outer circumferential joining portion between the gas inlet portion and an end portion of the bag body in a longitudinal direction of the vehicle and joins the vehicle exterior side base fabric and the vehicle interior side base fabric,
    the airbag, while being stored in the folded state, comprising
        a roll folding portion formed by folding the bag body into a roll shape in a direction from a lower edge of the bag body to an upper edge thereof with the vehicle interior side base fabric facing outside, and
        a flip folding portion formed by folding back the bag body with the vehicle interior side base fabric facing inside between the roll folding portion and the upper edge of the bag body,
    the restricting member comprising
        a tip portion fixed to a lower side of the sidewall of the vehicle, and
        a base end portion joined to the vehicle exterior side base fabric located at the flip folding portion or an upper end portion of the roll folding portion.

2. The curtain airbag device according to claim 1, wherein while the airbag is in the folded state, the restricting member includes, between the base end portion and the tip portion, a middle portion folded together with the roll folding portion.

3. The curtain airbag device according to claim 1, wherein the base end portion of the restricting member is attached to the joining portion of the airbag.

4. The curtain airbag device according to claim 1, wherein the airbag is provided with an opening on an end portion side thereof in the longitudinal direction of the vehicle relative to the region surrounded by the outer circumferential joining portion, and
the restricting member is passed through the opening.

5. The curtain airbag device according to claim 2, wherein the base end portion of the restricting member is attached to the joining portion of the airbag.

6. The curtain airbag device according to claim 2, wherein the airbag is provided with an opening on an end portion side thereof in the longitudinal direction of the vehicle relative to the region surrounded by the outer circumferential joining portion, and
the restricting member is passed through the opening.

7. The curtain airbag device according to claim 3, wherein the airbag is provided with an opening on an end portion side thereof in the longitudinal direction of the vehicle relative to the region surrounded by the outer circumferential joining portion, and
the restricting member is passed through the opening.

8. The curtain airbag device according to claim 5, wherein the airbag is provided with an opening on an end portion side thereof in the longitudinal direction of the vehicle relative to the region surrounded by the outer circumferential joining portion, and
the restricting member is passed through the opening.

* * * * *